United States Patent
Hatch

(10) Patent No.: US 9,394,998 B2
(45) Date of Patent: Jul. 19, 2016

(54) RADIAL SHAFT SEAL ASSEMBLY WITH SNAP IN AUXILIARY MEMBER

(71) Applicant: Federal-Mogul Corporation, Southfield, MI (US)

(72) Inventor: Frederick R. Hatch, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 820 days.

(21) Appl. No.: 13/645,303

(22) Filed: Oct. 4, 2012

(65) Prior Publication Data

US 2014/0097572 A1    Apr. 10, 2014

(51) Int. Cl.
*F16J 15/32* (2016.01)

(52) U.S. Cl.
CPC .......... *F16J 15/3232* (2013.01); *F16J 15/3252* (2013.01); *F16J 15/3268* (2013.01)

(58) Field of Classification Search
CPC .. F16J 15/3268; F16J 15/3232; F16J 15/3252
USPC .................................. 277/551, 562, 572–577
See application file for complete search history.

(56) References Cited

U.S. PATENT DOCUMENTS

| | | | |
|---|---|---|---|
| 2,867,457 A * | 1/1959 | Riesing et al. | ................. 277/562 |
| 3,511,512 A | 5/1970 | Wheelock | |
| 4,053,166 A | 10/1977 | Domkowski | |
| 4,448,426 A * | 5/1984 | Jackowski et al. | ............ 277/353 |
| 4,550,920 A | 11/1985 | Matsushima | |
| 4,721,314 A | 1/1988 | Kanayama et al. | |
| 4,960,335 A * | 10/1990 | Otto et al. | ...................... 384/484 |
| 5,056,799 A | 10/1991 | Takenaka et al. | |
| 5,137,285 A | 8/1992 | Pick | |
| 5,509,666 A * | 4/1996 | Abraham et al. | ............. 277/562 |
| 5,607,168 A | 3/1997 | Dahll | |
| 5,727,794 A * | 3/1998 | Fauchon et al. | ............... 277/551 |
| 5,957,461 A | 9/1999 | Ulrich | |
| 6,073,933 A | 6/2000 | Johnston | |
| 6,102,409 A | 8/2000 | Furuyama et al. | |

(Continued)

FOREIGN PATENT DOCUMENTS

| | | |
|---|---|---|
| DE | 7328356 U | 11/1973 |
| DE | 4213996 | 11/1993 |
| DE | 102008030287 A1 | 12/2009 |

OTHER PUBLICATIONS

International Search Report Mailed on Jan. 24, 2014 (PCT/US2013/062098).

*Primary Examiner* — Vishal Patel
*Assistant Examiner* — Stacy Warren
(74) *Attorney, Agent, or Firm* — Robert L. Stearns; Dickinson Wright, PLLC

(57) ABSTRACT

A shaft seal assembly includes a metal case having a wall extending cylindrically about a central axis with an annular leg extending radially inwardly from the wall toward the central axis. An elastomeric material is bonded to the leg and a primary seal lip is operably attached to the elastomeric material. The primary seal lip separates an oil side of the assembly from an air side of the seal assembly. The elastomer material has an annular groove formed on the air side of the primary seal lip. The assembly further includes an auxiliary lip subassembly including an annular metal washer with at least one auxiliary lip fixed thereto as a one-piece subassembly. The annular metal washer has an annular outer periphery snappingly received within the annular groove.

18 Claims, 3 Drawing Sheets

(56) References Cited

U.S. PATENT DOCUMENTS

| | | |
|---|---|---|
| 6,186,507 B1 | 2/2001 | Oldenburg |
| 6,199,869 B1 | 3/2001 | Furuyama et al. |
| 6,367,810 B1 | 4/2002 | Hatch |
| 6,406,026 B1 | 6/2002 | Oldenburg |
| 6,450,503 B1 * | 9/2002 | Dossena .............. F16J 15/3256 277/549 |
| 6,464,228 B1 | 10/2002 | Oldenburg |
| 6,726,212 B2 | 4/2004 | Oldenburg |
| 7,159,871 B2 | 1/2007 | Oldenburg |
| 7,347,424 B2 | 3/2008 | Madigan |
| 7,658,386 B2 | 2/2010 | Oldenburg |
| 7,832,735 B2 | 11/2010 | Paykin |
| 8,011,671 B2 | 9/2011 | Madigan |
| 2004/0169339 A1* | 9/2004 | Bock et al. .................... 277/549 |
| 2006/0012129 A1* | 1/2006 | Oldenburg ........... F16J 15/3256 277/572 |
| 2006/0170166 A1* | 8/2006 | Bengoa et al. ................ 277/371 |
| 2007/0158917 A1* | 7/2007 | Paykin ......................... 277/551 |
| 2011/0204577 A1* | 8/2011 | Hintenlang et al. .......... 277/549 |

* cited by examiner

RADIAL SHAFT SEAL ASSEMBLY WITH SNAP IN AUXILIARY MEMBER

BACKGROUND OF THE INVENTION

1. Technical Field

This invention relates generally to seal assemblies, and more particularly to rotary shaft seal assemblies.

2. Related Art

Shaft seals are commonly used throughout numerous types of vehicle applications. Aside from the shaft seal having a primary seal lip to establish a reliable seal against a running surface of a rotating shaft or wear sleeve, both to prevent the ingress of contamination and the egress of desirable lubrication, it is desirable to provide auxiliary seal lips to further prevent the ingress of contamination and the egress of desirable lubrication. Accordingly, it is known to construct a shaft seal having primary and auxiliary seal lips formed in a single operation and of the same material. Unfortunately, having to form the primary and auxiliary seal lips in a single operation and from the same material can come with drawbacks. For example, with the type of material being the same for both seal lips, the performance of one of the seal lips may be diminished in that the material may not be the optimal material for the particular seal lip. Further, if the seal lip material is costly, such as is often the case for auxiliary dust excluder seal lips, then economic inefficiencies may be incurred as a result of having to make the primary seal lip from the more costly material of the auxiliary seal lip. To resolve the problem of having to make the seal lips from the same material, it is further known to use separate operations to mold the separate seal lips from separate materials, with the separate seal lips ultimately being fixed in inseparable relation with one another with the seal assembly. This too comes with drawbacks of having to add potentially costly process operations to the manufacture process of the seal assembly. In addition, having a seal assembly with dedicated, integrally fixed seal lips typically limits the use of the seal assembly to a specific application, given the seal assembly is a single piece construction of inseparable components.

SUMMARY OF THE INVENTION

A shaft seal assembly constructed in accordance with one aspect of the invention includes a metal case having a wall extending cylindrically about a central axis with an annular leg extending radially inwardly from the wall toward the central axis. An elastomeric material is bonded to the leg and a primary seal lip is operably attached to the elastomeric material. The primary seal lip separates an oil side of the assembly from an air side of the seal assembly. The elastomer material has an annular groove formed on the air side of the primary seal lip. The assembly further includes an auxiliary lip subassembly including an annular metal washer with at least one auxiliary lip fixed thereto as a one-piece subassembly. The annular metal washer has an annular outer periphery snappingly received within the annular groove.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
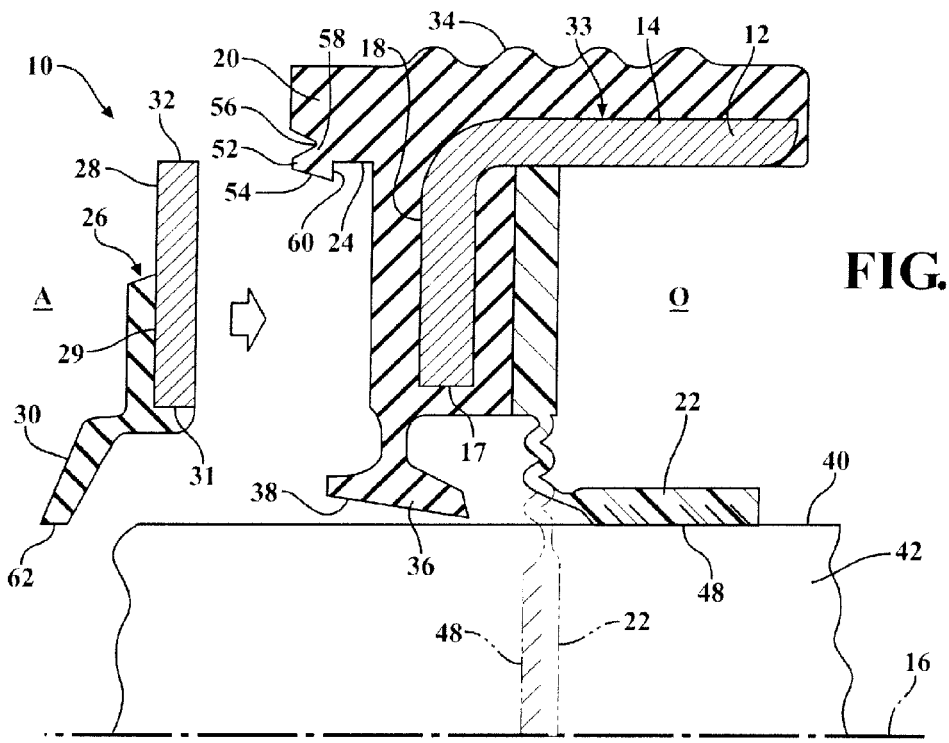
FIG. 1 is a cross-sectional view of a radial shaft seal assembly constructed in accordance with one aspect of the invention shown in an exploded, uninstalled state.

Referring in more detail to the drawings, FIGS. 1 (exploded) and 1A (assembled) illustrate a rotary shaft seal assembly, referred to hereafter as assembly 10, constructed in accordance with one aspect of the invention. The assembly 10 has an outer metal case 12, represented here, by way of example and without limitation, as being generally L-shaped in axial cross-section, having an outer wall 14 that extends cylindrically or substantially cylindrically about a central axis 16 of the assembly 10 and a leg 18 that extends radially inwardly from the wall 14 toward the central axis 16 to a free end 17. It should be recognized that the shape of the case 12 is not limited to the shape illustrated, and that any suitable shape configured for attached to an outer housing is contemplated to be within the scope of the claims. The assembly 10 further includes a body of elastomeric material 20, e.g. low cost rubber, bonded to the leg 18. A primary seal lip 22 is operably attached to the elastomeric material 20, wherein the primary seal lip 22 separates an oil side O of the assembly 10 from an air side A of the assembly 10. The elastomer material 20 has an annular groove 24 formed on the air side A of the primary seal lip 22. The assembly 10 further includes an auxiliary lip subassembly, referred to hereafter as subassembly 26, initially constructed separately from the assembly 10, wherein the subassembly includes an annular metal washer 28 with at least one auxiliary lip 30 fixed thereto as a one-piece subassembly. The metal washer 28 has an outer periphery 32 sized to be snappingly received within the annular groove 24 to releasably fix the subassembly 26 to the elastomeric material 20, thereby completing construction of the assembly 10.

The elastomeric material 20 can be molded about the entire or substantially an entire outer surface 33 of the case 12. As such, a radially outermost portion 34 of the elastomeric material 20 can be molded about an outer surface 33 of the outer wall 14, wherein the outermost portion 34 is sized on diameter to be received in a bore of a housing (not shown), such as in a line-to-line or slight interference press fit. In addition, the elastomeric material 20 can be molded about the outer surface 33 of the leg 18. Accordingly, the entire outer surface 33 of the leg 18 can be covered with the elastomeric material 20, thereby providing protection against to the case 12 against corrosion. Further yet, the elastomeric material 20 can be molded to form an annular secondary lip, referred to hereafter as an exclusion lip 36. The exclusion lip 36 is illustrated here, by way of example, as depending from the leg 18 and extending toward the primary seal lip 22, having an inclined surface 38 converging toward the oil side O. The conical surface 38 is sized to remain out of running contact with a running surface 40 of a shaft 42, thereby being a non-contact excluder, and thus, not contributing to running friction, but coming into closely spaced relation with the running surface 40 to inhibit the ingress of contamination on the air side A from entering the oil side O of the seal assembly 10.

The primary seal lip 22, such as a PTFE seal element, by way of example and without limitation, has a first portion 44 bonded to the elastomeric material 20 and a second portion 46 that extends radially inwardly from the first portion 44. The bonded portion 44 extends along the length or substantially along the length of the leg 18. The second portion 46 extends freely from the elastomeric material 20 in unsupported, non-bonded relation therewith to provide a sealing surface 48 of the primary seal lip 22. As such, the non-bonded portion 46 forms an unsupported elongate portion that extends in radial alignment with at least a portion of the outer wall 14. Upon being molded to the case 12, and while in an uninstalled state, the unsupported portion 46 extends radially inwardly beyond a shaft running surface, such that upon being installed about the shaft, the active sealing surface 48 of the unsupported elongate portion 46 is caused to extend parallel to the central axis 16 and sealingly engage the shaft 42 with an amount of bias that is predetermined, based on the physical and material characteristics of the unsupported portion 46. While installed, the flexing of the PTFE seal element 22 against the shaft occurs entirely over the elongate unsupported portion 46 and not within the bond portion 44. Accordingly, the amount of flex of the unsupported portion 46 and the magnitude of sealing force imparted by the unsupported portion 46 can be tightly controlled.

To facilitate flexing of the active sealing portion of the unsupported portion 46 of the PTFE sealing element 22 against the shaft 42 during use, the unsupported portion 46 can be formed having a hinge region formed as an undulating wall section 50, such as in a coining process, for example. The undulating wall 50 can be formed having a symmetrical, uniform wall thickness along its length, or it can be formed having a non-symmetrical wall thickness, thereby providing reduced thickness annular flex joints between thickened regions of the wall.

The annular groove 24 in the body 20 is sized for a close, preferably line-to-line or slightly tight fit of the washer outer periphery 32 of the auxiliary lip assembly 26, both widthwise and on the diameter. To facilitate snapping the auxiliary lip subassembly 26 onto the elastomeric body 20, an annular lip 52 bounding the air-side of the groove 24 has a frustoconical lead-in chamfered surface 54 that is inclined to diverge toward the air-side A. Accordingly, the chamfered surface 54 acts as a ramp to facilitate insertion of the washer 28 into the groove 24. To further facilitate insertion of the auxiliary lip subassembly 26, and annular groove, also referred to as notch 56, is formed radially outwardly from the lip 52 and immediately adjacent the lip 52 to form a hinge 58. The hinge 58 and notch 56 work together to allow the lip 52 to flex radially outwardly, thereby at least partially closing the notch 56, as the washer is sliding along the chamfered surface 54 to enhance smooth and reliable insertion of the subassembly 26 into the groove 24. Upon the washer 28 fully entering the groove 24 and moving out of contact with the chamfered surface 54, the hinge 58 biases the lip 52 back to its unbiased state, thereby bringing a shoulder 60 of the lip 52 into axial confrontation with the washer 28 to retain the subassembly 26 in the groove 24 during use. Of course, when desired, the lip 52 can be manually flexed radially outward by intentionally by applying a suitable radially outward force to the lip 52 to cause the lip 52 to pivot about the hinge 58, thus, allowing the subassembly 26 to be selectively removed and replaced by another subassembly 26, if desired.

Figure 1A:
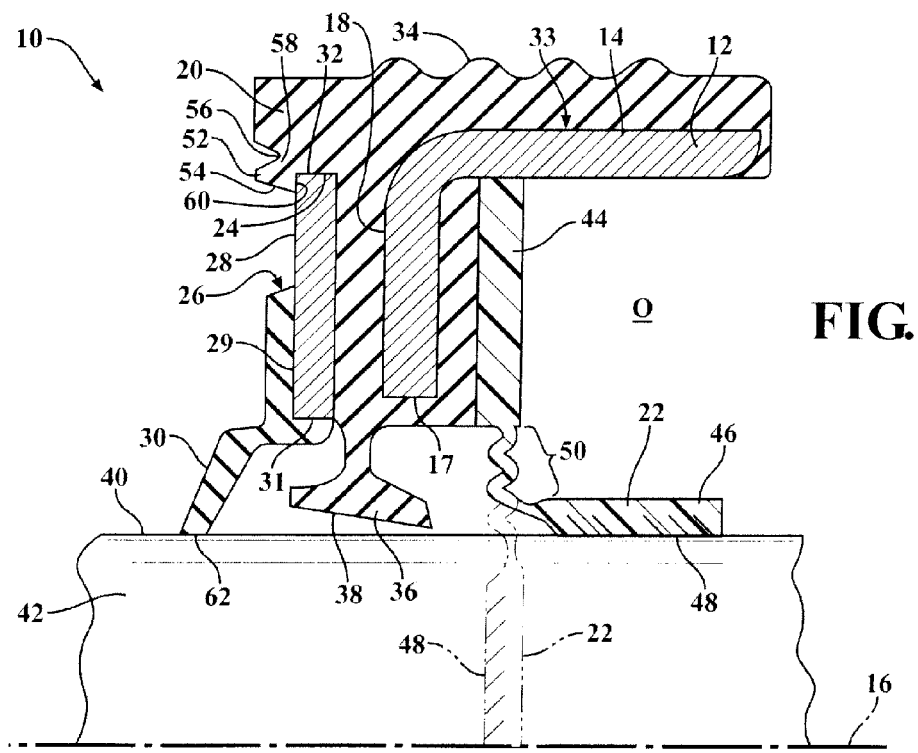
FIG. 1A is a view of the radial shaft seal assembly of FIG. 1 shown in an assembled, installed state.

In the embodiment of FIGS. 1 and 1A, the auxiliary lip 30 is bonded to an air-side face 29 and about an inner periphery 31 of the washer 28 and extends from the washer 28 toward the central axis 16 and toward the air-side A of the assembly 10. Accordingly, the auxiliary lip 30 is frustoconical in shape. The auxiliary lip 30 extends sufficiently radially inwardly such that a free end 62 of the lip 30 is brought into sealed engagement with the running surface 40 of the shaft 42. Accordingly, the auxiliary lip 30 is configured as a contact seal lip. The auxiliary lip 30 is formed from an elastic material that is bonded to the washer 28, such as in a molding process, by way of example. The elastic material can be provided as any seal grade elastomer, including rubber.

Figure 2:
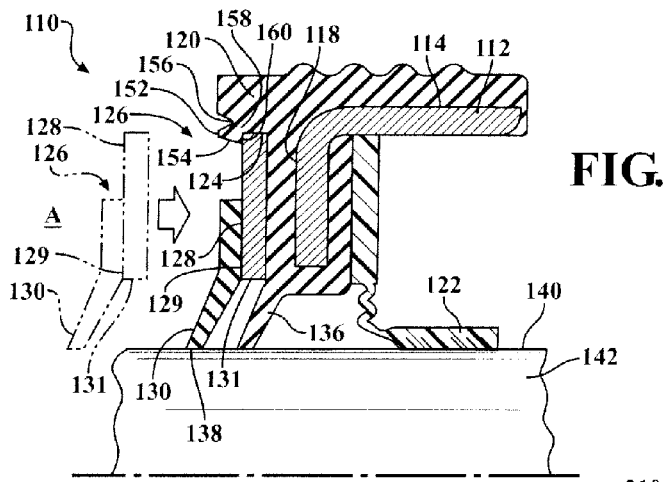
FIG. 2 is a cross-sectional view similar to FIG. 1A of a radial shaft seal assembly constructed in accordance with another aspect of the invention.

In FIG. 2, a rotary shaft seal assembly 110 constructed in accordance with another aspect of the invention is illustrated, wherein the same reference numerals, offset by a factor of 100, are used to indicate like features discussed above.

The assembly 110 includes the following features as substantially described above: a case 112 having a cylindrical outer wall 114 and a leg 118; an elastomeric body 120 bonded to the case 112; a primary seal lip 122 bonded to the elastomeric body 120; a secondary lip, referred to as exclusion lip 136, formed as one piece of material with the body 120, and an auxiliary lip subassembly 126 snappingly received in a groove 124 formed in the body 120.

The exclusion lip 136, rather than being formed as a non-contact excluder as described above and shown in FIGS. 1 and 1A, is formed as a contact excluder. Accordingly, the excluder lip 136 extends to a free end 138 that is brought into engagement with a running surface 140 of a shaft 142 upon assembly. The excluder lip 136 extends axially away from the primary seal lip 122 toward an air-side A of the assembly 110.

The auxiliary lip subassembly 126, rather than having the auxiliary lip 130 bonded to both an air-side face 129 and radially inner periphery 131 of the washer 128, is bonded solely to the air-side face 129 of the washer 128. Upon snapping the washer 128 into a groove 124 in the body 120, as discussed above, including a lip 152; chamfered surface 154; notch 156; hinge 158; and shoulder 160, the auxiliary lip 130 and excluder lip 136 are parallel or substantially parallel with one another, with both extending radially inwardly toward the air-side A of the assembly 110.

Figure 3:
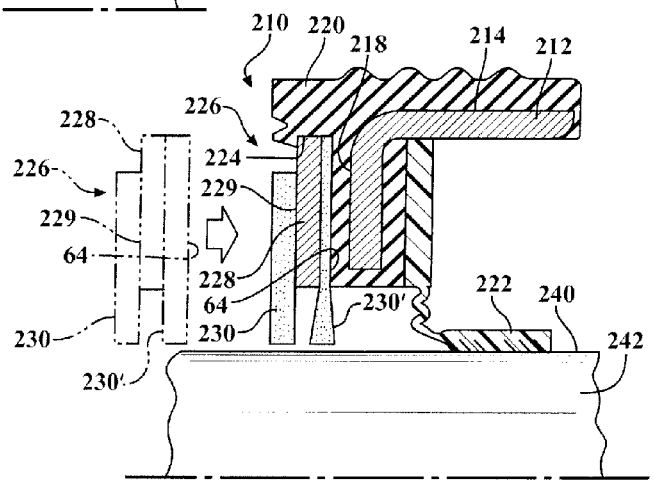
FIG. 3 is a cross-sectional view similar to FIG. 1A of a radial shaft seal assembly constructed in accordance with another aspect of the invention.

In FIG. 3, a rotary shaft seal assembly 210 constructed in accordance with another aspect of the invention is illustrated, wherein the same reference numerals, offset by a factor of 200, are used to indicate like features discussed above.

The assembly 210 includes the following features as substantially described above: a case 212 having a cylindrical outer wall 214 and a leg 218; an elastomeric body 220 bonded to the case 212; a primary seal lip 222 bonded to the elastomeric body 220; and an auxiliary lip subassembly 226 snappingly received in a groove 224 formed in the body 220.

The auxiliary lip subassembly 226 includes a washer 228 as discussed above, but rather than having an auxiliary lip formed of an elastomeric material, the auxiliary lip 230 is formed from a felt or foam material, such as an open or closed cell foam material, by way of example. The auxiliary lip 230 is bonded solely to the air-side face 229 of the washer 228.

Further, a secondary auxiliary lip 230', formed of felt or foam material, is bonded to an oil-side face 64 of the washer 228. As such, the washer 228 is sandwiched between the auxiliary lips 230, 230'. The secondary auxiliary lip 230' is shown as having the same or substantially the same outer diameter as the washer 228, and thus, is also received in the groove 224 in the body 220. Accordingly, the width of the groove 224 is formed sufficiently to accommodate both the width of the washer 228 and the secondary auxiliary lip 230. As shown, upon snapping the washer 228 into the groove 224, the secondary auxiliary lip 230' is compressed slightly between the washer 228 and the body 220, thereby providing a snug, tight fit of the auxiliary lip subassembly 226 to the body 220. The auxiliary lip 230 and secondary auxiliary lip 230', upon being installed about a shaft 242, remain spaced radially slightly outwardly from a running surface 240 of the shaft 242, and thus, are both non-contact auxiliary lips to prevent the ingress of contamination into the assembly 210. Of course, if desired, the lips 230, 230' could make running contact with the shaft 240, if desired, or could be constructed to initially make running contact and intentionally wear during initial run-in use to become extremely low or no friction lips.

Figure 4:
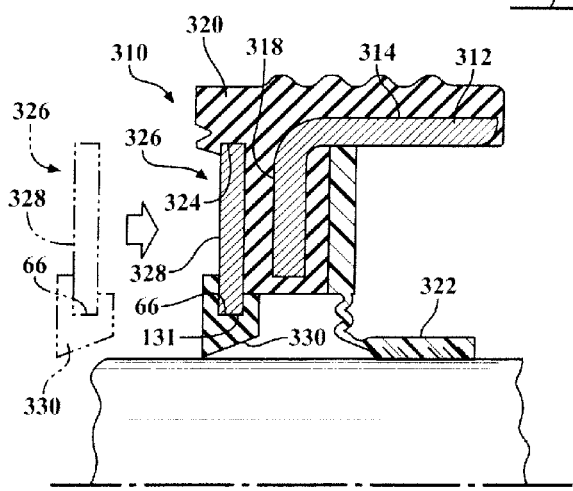
FIG. 4 is a cross-sectional view similar to FIG. 1A of a radial shaft seal assembly constructed in accordance with another aspect of the invention.

In FIG. 4, a rotary shaft seal assembly 310 constructed in accordance with another aspect of the invention is illustrated, wherein the same reference numerals, offset by a factor of 300, are used to indicate like features discussed above.

The assembly 310 includes the following features as substantially described above: a case 312 having a cylindrical outer wall 314 and a leg 318; an elastomeric body 320 bonded to the case 312; a primary seal lip 322 bonded to the elastomeric body 320; and an auxiliary lip subassembly 326 snappingly received in a groove 324 formed in the body 320.

The auxiliary lip subassembly 326 includes a washer 328 as discussed above, but rather than having an auxiliary lip formed of an elastomeric material, the auxiliary lip 330 is formed from a plastic material. The auxiliary lip 330 is fixed about a radially inner periphery 131 of the washer 328, and can be snapped thereto by inserting the radially inner periphery 131 of the washer 328 into a radially outwardly facing groove 66 of the auxiliary lip 330. Of course, any suitable mechanism could be used to fix the auxiliary lip 330 to the washer 328, including adhesives or bonding via molding the lip 330 to the washer 328.

Figure 5:
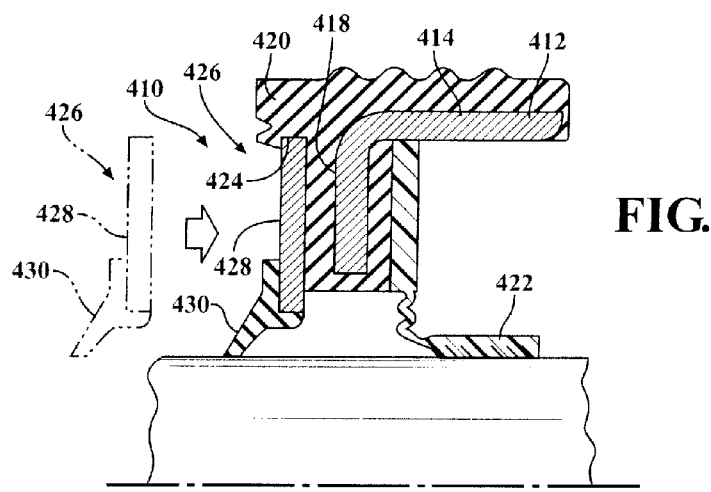
FIG. 5 is a cross-sectional view similar to FIG. 1A of a radial shaft seal assembly constructed in accordance with another aspect of the invention.

In FIG. 5, a rotary shaft seal assembly 410 constructed in accordance with another aspect of the invention is illustrated, wherein the same reference numerals, offset by a factor of 400, are used to indicate like features discussed above.

The assembly 410 includes the following features as substantially described above: a case 412 having a cylindrical outer wall 414 and a leg 418; an elastomeric body 420 bonded to the case 412; a primary seal lip 422 bonded to the elastomeric body 420; and an auxiliary lip subassembly 426 snappingly received in a groove 424 formed in the body 420.

The assembly 410 is similar to the assembly 10 of FIGS. 1 and 1A, however, the body 420 does not include an exclusion lip. Accordingly, the assembly 410 only includes the primary seal lip 422 formed as one piece of material with the body 420 and an auxiliary lip 430. The auxiliary lip 430 is bonded to a washer 428 similarly as described above for FIGS. 1 and 1A, and thus, no further discussion is needed.

Figure 6:
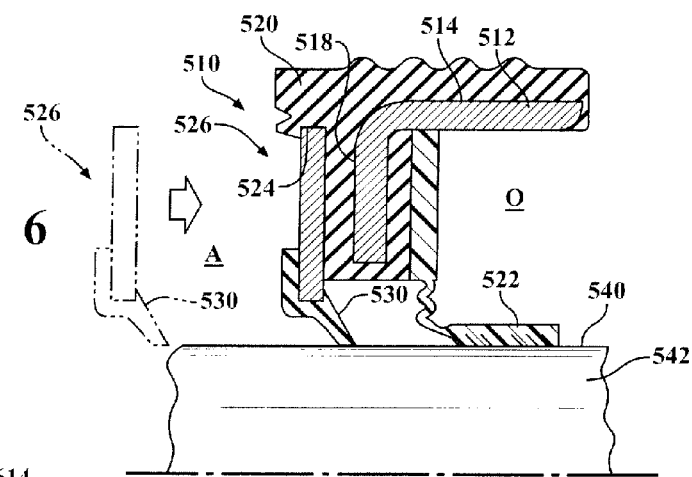
FIG. 6 is a cross-sectional view similar to FIG. 1A of a radial shaft seal assembly constructed in accordance with another aspect of the invention.

In FIG. 6, a rotary shaft seal assembly 510 constructed in accordance with another aspect of the invention is illustrated, wherein the same reference numerals, offset by a factor of 500, are used to indicate like features discussed above.

The assembly 510 includes the following features as substantially described above: a case 512 having a cylindrical outer wall 514 and a leg 518; an elastomeric body 520 bonded to the case 512; a primary seal lip 522 bonded to the elastomeric body 520; and an auxiliary lip subassembly 526 snappingly received in a groove 524 formed in the body 520.

The assembly 510 is similar to the assembly 410 of FIG. 5, however, rather than an auxiliary lip 530 of the auxiliary lip subassembly 526 extending toward an air-side A of the assembly 510, the auxiliary lip 530 extends radially inwardly toward an oil-side O of the assembly 510 into running, sealing engagement with a running surface 540 of a shaft 542. As such, the auxiliary lip 530 extends toward the primary seal lip 522 to provide enhance lubrication retention on the oil-side O of the assembly 510.

Figure 7:
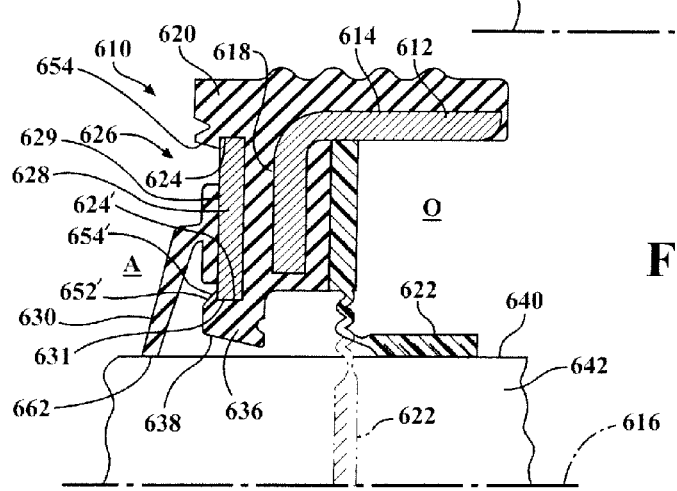
FIG. 7 is a cross-sectional view similar to FIG. 1A of a radial shaft seal assembly constructed in accordance with another aspect of the invention.

In FIG. 7, a rotary shaft seal assembly 610 constructed in accordance with another aspect of the invention is illustrated, wherein the same reference numerals, offset by a factor of 600, are used to indicate like features discussed above.

The assembly 610 includes the following features as substantially described above: a case 612 having a cylindrical outer wall 614 and a leg 618; an elastomeric body 620 bonded to the case 612; a primary seal lip 622 operably attached to the elastomeric body 620, shown as being bonded to the elastomeric body 620; and an auxiliary lip subassembly 626 snappingly received in a groove 624. However, unlike the previous embodiments, the subassembly 626 is also snappingly received in another groove 624' formed in the body 620. Accordingly, the retention of the subassembly 626 to the body 620 is enhanced, thereby ensuring that inadvertent displacement of the subassembly 626 relative to the body 620 is avoided, such as under increased axial loading experienced during assembly, for example.

The assembly 610 is similar to the assembly 10 of FIG. 1, including having an annular secondary lip radially aligned with the groove 624', referred to hereafter as an exclusion lip 636 having an inclined, conical surface 638 converging toward the oil side O. The conical surface 638 is shown as being radially aligned with the groove 624' and sized to remain out of running contact with a running surface 640 of a shaft 42, thereby being a non-contact excluder, and thus, not contributing to running friction, but coming into closely spaced relation with the running surface 640 to inhibit the ingress of contamination on the air side A from entering the oil side O of the seal assembly 10. However, in addition to functioning as an exclusion lip, the body of the exclusion lip 636 includes the annular groove 624' facing radially outwardly to facilitate retaining the subassembly 626 in fixed relation with the body 620.

The annular groove 624', like the radially outer annular groove 624, is sized for a close, preferably line-to-line or slightly tight fit of an inner periphery 631 of the washer 628 of the auxiliary lip assembly 626, both widthwise and on the diameter. To facilitate snapping the auxiliary lip subassembly 626 onto the elastomeric body 620, an annular lip 652' bounding the air-side of the groove 624' has a frustroconical lead-in chamfered surface 654' that is inclined to diverge toward the air-side A. Accordingly, the chamfered surface 654', together with a radially outer chamfered surface 654, act as ramps to facilitate insertion of the washer 628 into the grooves 624, 624'.

In the embodiment of FIG. 7, the auxiliary lip 630 is bonded to an air-side face 629 of the washer 628 and extends from the washer 628 toward the central axis 616 and toward the air-side A of the assembly 610. Accordingly, the auxiliary lip 630 is frustroconical in shape. The auxiliary lip 630 extends sufficiently radially inwardly such that a free end 662 of the lip 630 is brought into sealed engagement with the running surface 640 of the shaft 642. Accordingly, the auxiliary lip 630 is configured as a contact seal lip. The auxiliary lip 630 is formed from an elastic material that is bonded to the washer 628, such as in a molding process, by way of example. The elastic material can be provided as any seal grade elastomer, including rubber.

Obviously, many modifications and variations of the present invention are possible in light of the above teachings. It is, therefore, to be understood that within the scope of the appended claims, the invention may be practiced otherwise than as specifically described.

What is claimed is:

1. A shaft seal assembly, comprising:
   a metal case having a wall extending cylindrically about a central axis with an annular leg extending radially inwardly from said wall toward said central axis, said annular leg having a first side facing an oil side of said assembly and a second side facing an air side of said assembly;
   an elastomeric material bonded to said first and second sides of said leg;
   a primary seal lip operably attached to said elastomeric material on said first side of said annular leg, said primary seal lip separating said oil side from said air side of said seal assembly;
   said elastomeric material having at least one annular groove formed on said second side of said annular leg adjacent said annular leg such that said annular leg is between said annular groove and said primary seal lip; and
   an auxiliary lip subassembly including an annular metal washer with at least one auxiliary lip fixed thereto as a one-piece subassembly, said annular metal washer having an annular outer periphery snappingly received within said at least one annular groove to fix said auxiliary lip to said elastomeric material for rotation therewith.

2. The shaft seal assembly of claim 1 wherein said primary seal lip has an elongate portion configured to extend axially along a running surface, said elongate portion extending toward said oil side to a free end.

3. The shaft seal assembly of claim 2 wherein said auxiliary lip extends toward said air side.

4. The shaft seal assembly of claim 3 wherein said auxiliary lip is configured to sealingly engage the running surface.

5. The shaft seal assembly of claim 3 wherein said auxiliary lip is configured to remain entirely spaced from the running surface.

6. The shaft seal assembly of claim 1 wherein said auxiliary lip is an open cell foam material.

7. The shaft seal assembly of claim 6 wherein said auxiliary lip includes a pair of said auxiliary lips with said washer being sandwiched between said pair of auxiliary lips.

8. The shaft seal assembly of claim 1 wherein said auxiliary lip is rubber molded to said washer.

9. The shaft seal assembly of claim 1 wherein said auxiliary lip is plastic.

10. The shaft seal assembly of claim 9 wherein said auxiliary lip has a radially outward facing annular groove with said washer having an annular inner periphery received in said groove.

11. The shaft seal assembly of claim 1 further comprising a secondary lip molded as one piece of material with said elastomeric material.

12. The shaft seal assembly of claim 11 wherein said secondary lip is between said primary seal lip and said auxiliary lip.

13. The shaft seal assembly of claim 12 wherein said secondary lip extends axially toward said primary seal lip.

14. The shaft seal assembly of claim 12 wherein said secondary lip extends axially away from said primary seal lip.

15. The shaft seal assembly of claim 1 wherein said elastomeric material has a pair of said annular grooves with one of said annular grooves being a radially outer annular groove and the other of said annular grooves being a radially inner annular groove, said annular outer periphery of said annular metal washer being snappingly received within said radially outer annular groove, said annular metal washer having an annular inner periphery snappingly received within said radially inner annular groove.

16. The shaft seal assembly of claim 1 further including an annular lip extending axially from at least one of said at least one annular groove toward said air side, said annular lip being flexible radially outwardly to facilitate insertion of said annular metal washer in said at least one annular groove.

17. The shaft seal assembly of claim 16 further including a hinge connecting said annular lip to said elastomeric material.

18. A shaft seal assembly, comprising:
   a metal case having a wall extending cylindrically about a central axis with an annular leg extending radially inwardly from said wall toward said central axis;
   an elastomeric material bonded to said leg;
   a primary seal lip operably attached to said elastomeric material, said primary seal lip separating an oil side from an air side of said seal assembly;
   said elastomeric material having at least one annular groove formed on said air side of said primary seal lip;
   an auxiliary lip subassembly including an annular metal washer with at least one auxiliary lip fixed thereto as a one-piece subassembly, said annular metal washer having an annular outer periphery snappingly received within said at least one annular groove,
   wherein said elastomeric material has a pair of said annular grooves with said annular metal washer having an annular inner periphery snappingly received within one of said pair of annular grooves; and
   further comprising a secondary lip molded as one piece of material with said elastomeric material in radial alignment with said pair of annular grooves.

* * * * *